US006811841B1

(12) United States Patent
Castiglione et al.

(10) Patent No.: US 6,811,841 B1
(45) Date of Patent: Nov. 2, 2004

(54) LIGHT-STABLE STRUCTURES

(75) Inventors: Stephanie B. Castiglione, Hudson, WI (US); Olester Benson, Jr., Woodbury, MN (US); Richard M. Fischer, Jr., Hudson, WI (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/413,684

(22) Filed: Apr. 15, 2003

(51) Int. Cl.[7] .............................. E06B 3/24; E04C 2/54
(52) U.S. Cl. .................. 428/34; 428/913.3; 52/786.11
(58) Field of Search ............................. 428/34, 913.3; 52/786.1, 786.11

(56) References Cited

U.S. PATENT DOCUMENTS

| 4,576,850 | A | | 3/1986 | Martens |
| 5,156,894 | A | * | 10/1992 | Hood et al. ............... 428/34 |
| 5,270,084 | A | | 12/1993 | Parker |
| 5,580,620 | A | | 12/1996 | Campbell et al. |
| 5,840,407 | A | | 11/1998 | Futhey et al. |
| 5,972,453 | A | | 10/1999 | Akiwa et al. |
| 6,143,387 | A | | 11/2000 | Kubler et al. |
| 6,259,541 | B1 | * | 7/2001 | Town ......................... 359/1 |
| 2002/0028862 | A1 | | 3/2002 | Johnson et al. |

FOREIGN PATENT DOCUMENTS

| DE | 297 06 880 U1 | 7/1997 |
| DE | 299 01 026 U1 | 7/1999 |
| JP | 08-231930 | 9/1996 |
| WO | WO 98/55294 | 12/1998 |
| WO | WO 01/53390 A1 | 7/2001 |
| WO | WO 01/53392 A1 | 7/2001 |
| WO | WO 01/53393 A1 | 7/2001 |
| WO | WO 01/53403 A2 | 7/2001 |
| WO | WO 01/92395 A1 | 12/2001 |

OTHER PUBLICATIONS

Fischer et al., "Analytical Studies of Spectrally Exposed Polyethylenenaphthalate" Proceedings of the Polymer Material Science and Engineering Symposium, American Chemical Society, Washington, DC, Aug. 2000.
Carlsson et al., "The Photodegradation of Polypropylene. IV. UV Stabilizer Decomposition", *Journal of Applied Polymer Science*, vol. 22, (1978), John Wiley & Sons, pp. 2217–2228.
Padron, "Mechanistic Aspects of Polymer Photostabilization", *Journal of Photochemistry and Photobiology, A: Chemistry*, vol. 49 (1989), Elsevier Sequoia, pp. 1–39.
Gerlock et al., "Reaction of benzotriazole ultraviolet light absorbers with free radicals", *Polymer Degradation and Stability*, vol. 48 (1995), Elsevier Science Limited, pp. 121–130.
Dearth et al., "The LC/MS/MS characterization of photolysis products of benzotriazole–based ultraviolet absorbers", *Polymer Degradation and Stability*, vol. 48 (1995), Elsevier Science Limited, pp. 111–120.
Pickett, "Permanence of UV Absorbers in Plastics and Coatings", *Handbook of Polymer Degradation*, Second Edition, S. H. Hamid, ed., Chapter 5, (1997), pp. 163–190.
Pickett, "UV Absorber Permanence and Coating Lifetimes", *New Directions in Coatings Performance Technology*, ASTM SPT 1435, W.C. Golton, Ed.

* cited by examiner

Primary Examiner—Donald J. Loney (57) ABSTRACT

An assembly including a polymeric film and an effective amount of an ultraviolet light-absorbing compound in an inert environment. The inert environment is bounded on at least one side by a pane, which is at least partially transparent to ultraviolet light. The ultraviolet light-absorbing compound includes a triazine. The structure may also include resin, adhesive and primer layers.

36 Claims, 2 Drawing Sheets

LIGHT-STABLE STRUCTURES

BACKGROUND

The present invention relates to light-stable structures, specifically structures comprising a polymeric film and an ultraviolet light-absorbing compound that inhibits degradation of the film despite exposure to ultraviolet light in an inert environment.

A vast number of polymeric films are available for use in a wide variety of applications. For example, polymeric films may be used as decorative or protective layers. Use of some polymeric films can be severely limited for outdoor applications and other applications where the films are exposed to a source of light. For example, many polymeric films degrade when subjected to prolonged exposure to ultraviolet (UV) radiation (i.e., wavelengths less than about 400 nanometers (nm), e.g., wavelengths between about 200 and 400 nm, e.g. wavelengths between about 315 and 400 nm). Exposure to UV radiation occurs naturally during use outdoors or during exposure to fluorescent light or other UV-emitting light sources.

Polymeric films that have undergone UV degradation may show detrimental changes in color and/or mechanical properties. Color-fast films resist color degradation. Certain films are known to have inherent color-fastness in the presence of UV light. Other polymeric films do not exhibit color-fastness, for example, clear films containing an aromatic moiety (e.g., some polyesters) may yellow when exposed to UV light. These non-color-fast films may require the addition of a modifier such as a UV stabilizer. The modifier may be incorporated directly into the polymeric film, it may be present in a coating applied to one or both surfaces of the film, or it may be part of a layer positioned between the source of the ultraviolet light and the polymeric film.

SUMMARY

Briefly, in one aspect, the present invention provides an assembly comprising an inert environment bounded on at least one side by a pane, wherein the pane is at least partially transparent to ultraviolet light, a structure positioned in the inert environment, the structure comprising a polymeric film and an effective amount of a ultraviolet light-absorbing compound, wherein the ultraviolet light absorbing compound comprises a triazine.

In another aspect, the present invention provides an assembly comprising an inert environment bounded on at least one side by a pane, wherein the pane is at least partially transparent to ultraviolet light, a structure positioned in the inert environment, the structure comprising a polymeric film, a resin layer and an effective amount of a ultraviolet light-absorbing compound, wherein the ultraviolet light absorbing compound comprises a triazine.

In yet another aspect, the present invention provides an assembly comprising an inert environment bounded on at least one side by a pane, wherein the pane is at least partially transparent to ultraviolet light, a structure positioned in the inert environment, the structure comprising a polymeric film, a layer comprising a first smooth surface and second structured surface being formed of a plurality of spaced parallel grooves, each said groove being formed by a first facet which is substantially perpendicular to the first smooth surface and a second facet which makes an angle between 1 to 60 degrees with the first smooth surface, and an effective amount of a ultraviolet light-absorbing compound, wherein the ultraviolet light-absorbing compound comprises a triazine.

In yet another aspect, the present invention provides an assembly comprising an inert environment bounded on at least one side by a pane, wherein the pane is at least partially transparent to ultraviolet light, a structure positioned in the inert environment, the structure comprising a polymeric film and an effective amount of a ultraviolet light-absorbing compound, wherein the ultraviolet light absorbing compound comprises a triazine, wherein the structure exhibits a delta b* yellowing value of less than 9 after exposure to a radiant dose of 6000 kJ/m$^2$ at 340 nm, according to ASTM G-155 test method, employing a repeating test cycle of 8 hours of light at 88° C., black panel temperature, followed by 4 hours dark at 50° C., wherein the delta b* value is based on D-65, 10 degree observer, specular included, reflectance measurements. The b* values are based on the CIELab colorspace.

In yet another aspect, the present invention provides an assembly comprising a first pane, a second pane, a frame, wherein the frame secures the first and second pane, an inert environment between the first and second panes, a polymeric film positioned in the inert environment, and an effective amount of a ultraviolet light-absorbing compound, wherein the ultraviolet light absorbing compound comprises a triazine.

The above summary of the present invention is not intended to describe each discussed embodiment of the present invention.

DETAILED DESCRIPTION

Some applications for polymeric films involve placing a polymeric film in an inert environment. As used herein, the phrase "inert environment" means an environment substantially free of oxygen (e.g., less than about 3% by volume oxygen, e.g., less than about 2.1% by volume oxygen, e.g., less than about 1.5% by volume oxygen, e.g., less than about 1% by volume oxygen). The inert environment may comprise one or more inert gases such as, for example, noble gases (e.g., argon, krypton, neon), and nitrogen. In some embodiments, the inert environment comprises at least about 80% by volume inert gas (e.g., at least about 90% by volume, e.g., at least about 95% by volume). The pressure may be less than atmospheric pressure (e.g., less than about 1×10$^5$ N/m$^2$, e.g., less than about 0.6×10$^5$ N/m$^2$), atmospheric (i.e., about 1×10$^5$ N/m$^2$), or greater than atmospheric (i.e., greater than about 1×10$^5$ N/m$^2$).

One application where polymeric films are used in an inert environment is as part of a protective or decorative structure in an insulated window. An example of a polymeric film for protective applications is the use of suspended films (e.g., films sold under the trade names HEAT MIRROR 88 or HEAT MIRROR 66, manufactured by Southwall Technologies, located in Palo Alto, Calif.) for reducing thermal conductivity through the window, and improving the energy rating of the window. Additional examples of films used for protection include polyester films used for screening UV light, and for preventing glass spread upon breakage in security applications. Examples of such polyester-based products include films sold under the trade names SCOTCHSHIELD Ultra Safety and Security Window Films and SCOTCHTINT Sun Control Film, both available from 3M Company, located in St. Paul, Minn.

One example of the use of polymeric films for decorative purposes has been described in U.S. Pat. No. 5,840,407 (Futhey et al.), incorporated herein by reference. Futhey et al. describe a transparent optical film made of a polymeric material having a first smooth surface and a second structured surface for providing a simulated beveled appearance. The structured surface of the film is formed of a plurality of spaced parallel grooves, each groove being formed by a first facet, which is substantially perpendicular to the first smooth surface and a second facet which makes an angle between 1 to 60 degrees with the first smooth surface. The film may be affixed to glass to simulate beveled glass. Futhey et al. also describe the use of polymeric films to achieve other decorative effects (e.g., V-groove cut effect, leaded glass, and textured glass (e.g., ripple glass, hammered glass, moss glass, flemish glass, glue chip glass, and baroque glass)).

Figure 1:
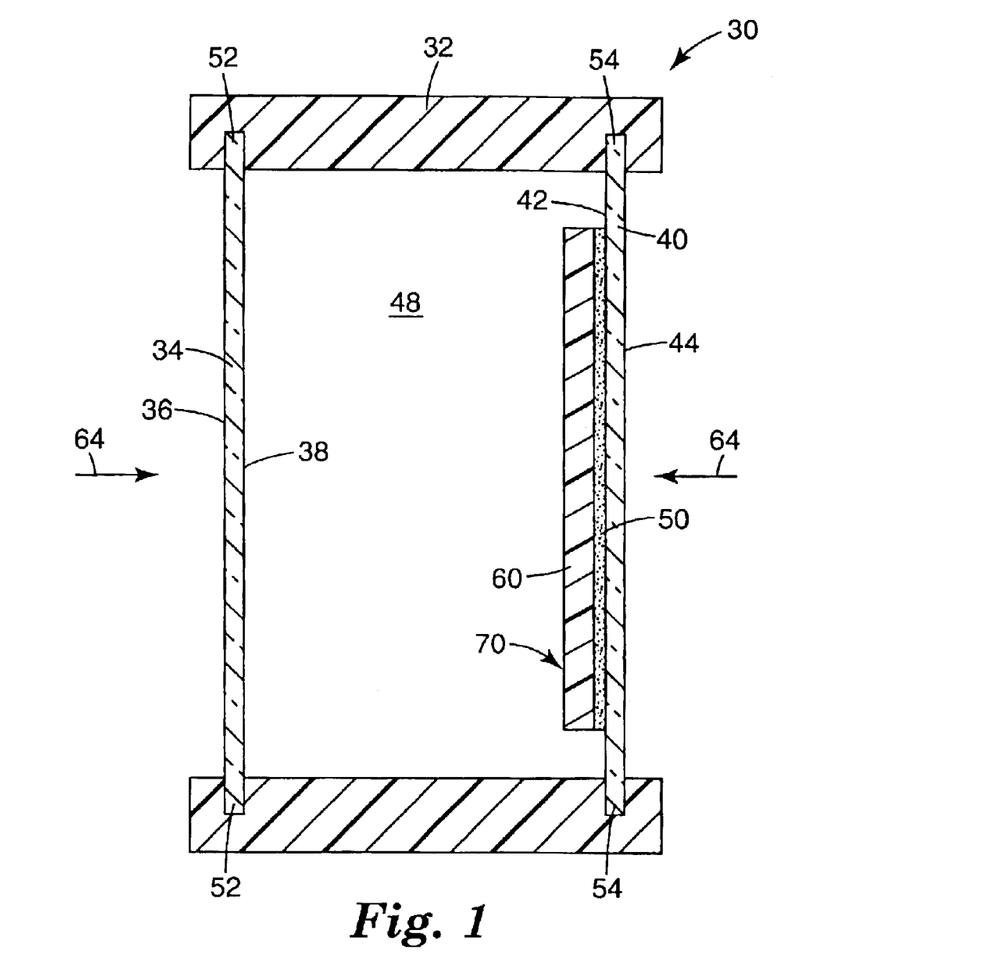
FIG. 1 is a side view of a structure in an inert environment in accordance with an embodiment of the present invention.

FIG. 1 shows a cross-section of a multi-pane, insulated window 30 comprising a frame assembly 32, and at least two panes of gas-impermeable, light-transmitting material 34 and 40. The frame assembly 32, secures the peripheral edges 52 and 54, of each pane 34 and 40, holding them in a substantially parallel relation to each other. A hermetically sealed chamber 48, is formed between the panes 34 and 40, bounded peripherally by the frame assembly 32. In some applications, the hermetically sealed chamber 48, is evacuated creating a vacuum. In other applications, the hermetically sealed chamber 48, is filled with an inert gas. However, a hermetically sealed chamber is not required so long as there is an inert environment bounded on at least one side by a pane.

A pane may comprise glass, plastic or a combination thereof. A pane may be transparent or translucent, and may be tinted and/or contain printed images. A pane may have one layer or multiple layers. A pane may, for example, be safety glass where two pieces of glass are laminated to a polyvinyl butyral film such that the film is between the two sheets of glass. A pane may be, for example, laminated glass where two pieces of glass or plastic (e.g., polymethylacrylate, polymethyl methacrylate) are laminated to a polymer film (e.g., polyester film) such that the film is between the two sheets of glass or plastic. Optionally, a resin layer may be positioned between the polymer film and one or both sheets of glass or plastic. A pane may optionally comprise thermally tempered glass, where the glass has been heated and rapidly cooled, or chemically tempered glass, where 2–10 microns of each side of the glass are hardened by a chemical process. A pane may be, for example, low emissivity glass where the glass is coated with a metal or an oxide layer (e.g., glass available under the trade names Lo $\bar{E}^2$-40, Lo$\bar{E}^2$-170, Lo$\bar{E}^2$-172, and Lo$\bar{E}^2$-178 from Cardinal IG, located in Minneapolis, Minn.). A pane can alternatively comprise plastics such as, for example, polycarbonate or polymethylmethacrylate based polymers.

Ultraviolet light 64, may pass through the first pane 34, from the first surface 36, of the first pane 34, to the second surface 38, of the first pane, 34. Alternatively, ultraviolet light 64, may pass through the second pane 40, from the second surface 44, of the second pane 40, to the first surface 42, of the second pane, 40. In some applications, ultraviolet light 64, may pass through both the first pane 34, and the second pane 40.

A structure 70, may be located between the panes 34 and 40, thus positioned in the hermetically sealed chamber 48.

The structure 70, is shown adhered to the first surface 42, of the second pane 40, by adhesive layer 50. In some embodiments, the structure 70 may be adhered to the second surface 38, of the first pane 34. In some embodiments, the structure 70, may be supported between the two panes 34 and 40, by, for example, the frame assembly 32.

In FIG. 1, the structure 70, is shown as comprising a first layer 60, and an adhesive layer 50. In some embodiments, the adhesive layer 50, may not be present. In some embodiments, the first layer 60, may be bonded to, for example, the first surface 42, of the second pane 40.

The first layer 60, comprises at least one polymeric film. The first layer 60, may be a multilayer film. For example, the first layer 60, may comprise adhesive layer(s), resin layer(s), bonding layer(s), primer layer(s), polymeric and/or non-polymeric film(s). One or more layers of the structure 70, may optionally further comprise additives such as, for example, dyes, flame retardants, ultraviolet light absorbers, antioxidants, hindered amine stabilizers, and combinations thereof.

Figure 2:
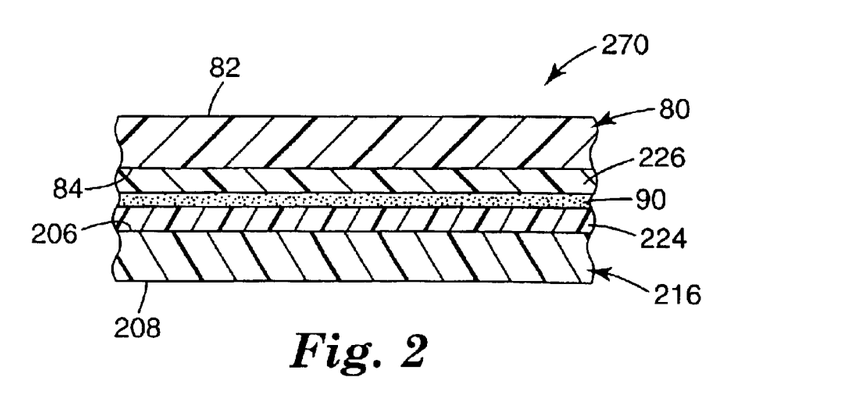
FIG. 2 is a side view of a multilayer structure in accordance with an embodiment of the present invention.

FIG. 2 shows an exemplary multilayer structure 270. The multilayer structure 270, comprises a first layer 216, and a second layer 80. The first layer 216, is a polymeric film. The second layer 80, may be, for example, a polymeric film, a resin layer, an ink layer, or a metalized layer (e.g. vapor deposited metal). In some embodiments, the second surface 84, of the second layer 80, may be bonded directly to a first surface 206, of the first layer 216 (not shown). In some embodiments, a bonding layer 90, may be present between the first surface 206, of the first layer 216, and the second surface 84, of the second layer 80. In some embodiments, a first primer layer 224, may be located between the bonding layer 90, and the first surface 206, of the first layer 216. In some embodiments, a second primer layer 226, may be located between the bonding layer 90, and the second surface 84, of the second layer 80.

In some embodiments, the bonding layer 90, may be an adhesive (e.g., a pressure sensitive adhesive). In some embodiments, the bonding layer 90, may be curable material (e.g., moisture curable, thermal curable, radiation curable).

In some embodiments, an adhesive layer (not shown) may be applied to the second surface 208, of the first layer 216. In some embodiments, an adhesive layer (not shown) may be applied to the first surface 82, of the second layer 80.

In some embodiments, polymeric films exposed to UV radiation in an inert environment show an objectionable color change. An improvement over the existing structures is desirable if they are to be used in an inert environment in applications requiring extended exposure to ultraviolet light.

The yellowing caused by UV degradation often occurs by photolysis. Photolysis occurs when a chemical species present in the structure absorbs a photon initiating further reactions which result in the formation of a chromophore. The chromophore absorbs light in the visible region of the spectrum giving the film its colored (i.e., yellow) appearance.

In an oxygen-containing environment, the structure may also undergo photooxidation. Photooxidation is the normal degradation process for organic materials exposed to ultraviolet light in an oxygen-containing environment.

"Photo-bleaching" refers to photooxidation that alters the chromophores formed by photolysis, thus reducing or eliminating yellowing. The chromophores formed by photolysis absorb photons and react with oxygen to form a new species. The presence of this new species does not result in an objectionable color (e.g. yellow) in the structure.

In an inert environment, photooxidation is expected to be substantially reduced or eliminated. In such an environment, materials that were rendered color-fast in an oxygen-containing environment due to photobleaching may show unacceptable levels of yellowing.

To prevent or inhibit photodegradation of a structure, an ultraviolet light stabilizer can be incorporated into or applied to one or more of the layers comprising the structure. A UV stabilizer may also be incorporated into or applied to one or more surfaces of a pane. UV stabilizers include materials that inhibit photoinitiation (e.g., UV absorbers (UVAs) and excited state quenchers), and materials that inhibit the subsequent oxidative processes (e.g., radical scavengers and alkyl hydroperoxide decomposers).

One factor affecting the selection of a photostabilizer is the environment to which the structure will be exposed. In an environment that is essentially free of oxygen, materials that inhibit oxidative processes may be unnecessary. Other factors affecting the selection of a photostabilizer include chemical compatibility, processability, optical clarity, color, thermal stability, and cost.

UVAs function by competitively absorbing the UV energy that causes photodegradation of the structure. A wide variety of ultraviolet light-absorbing compounds are available including, for example, benzophenones (e.g., materials sold under the trade names CYASORB UV-531 (available from Cytec Industries Inc., located in West Paterson, N.J.), and UVINUL 3008 (available from BASF, located in Mount Olive, N.J.)), benzotriazoles (e.g., materials sold under the trade names CYASORB UV-5411 (available from Cytec Industries Inc.), and TINUVIN 329, TINUVIN 360, and TINUVIN 571 (available from Ciba Specialty Chemicals North America, located in Tarrytown, N.Y.)), triazines (e.g., materials sold under the trade names CYASORB UV-1164 (available from Cytec Industries Inc.), and TINUVIN 400 and TINUVIN 1577 (available from Ciba Specialty Chemicals North America)), oxanilides (e.g., materials sold under the trade names TINUVIN 312 (available from Ciba Specialty Chemicals North America), and SANDUVOR VSU (available from Clariant AG, located in Muttenz, Switzerland)), benzoxazinones (e.g., CYASORB UV-3638 (available from Cytec Industries Inc.), cyanoacrylates (e.g., UVINUL 3039 (available from BASF)), and benzilidine malonates (e.g., HOSTAVIN PR-25 (available from Clariant AG).

The presence of a UVA can significantly improve the durability of polymers exposed to UV light. In general, the selection of a UVA is based on factors such as chemical compatibility, processability, optical clarity, color, thermal stability, and cost. In addition, some classes of UVA are known to show accelerated loss rates when exposed to UV light in the presence of oxygen (i.e., they undergo photooxidation), which may make them less desirable for that reason.

If these UVAs were used in an inert environment, one would expect that their loss rates would be significantly reduced. Thus, for systems where the UV exposure occurs in an inert environment, differences between classes of UVA based on susceptibility to photooxidation would be substantially eliminated.

Surprisingly, even in an inert environment, specific classes of UVA have superior resistance to photodegradation. For example, the use of triazine (e.g., hydroxy-functional tris-aryl triazine (e.g., 2-(4,6-diphenyl-1,3,5-triazin-2-yl)-5-hexyloxy-phenol and 2-(4,6-bis(2,4-dimethylphenyl)-1,3,5-triazin-2-yl)-5-(octyloxy)phenol)) UVAs resulted in less color change when the films were exposed to UV light in an inert environment.

The articles of the present invention generally comprise a structure in an inert environment. In some embodiments, the inert environment is bounded on at least one side by a pane. In some embodiments, the inert environment is between two panes. In some embodiments, the two panes are secured by a frame. In some embodiments, the structure comprises at least one polymeric film and an effective amount of at least one light stabilizing composition. In some embodiments at least one of the panes comprises the light stabilizing composition. The light stabilizing composition comprises an ultraviolet light-absorbing compound.

The polymeric film of the invention may be virtually any polymeric material. The polymeric material may be transparent, translucent or opaque, uniaxially oriented, biaxially oriented or unoriented.

The polymeric film may comprise, for example, polyolefins (e.g., polyethylene, polypropylene, ethylene vinyl acetate copolymers, ethylene acrylic acid copolymers, ionomers of ethylene and mixtures thereof), polyesters, polyimides, polystyrenes, acrylics, polyacrylates, polymethacrylates, polymethylmethacrylates, polyurethanes, urethane acrylate polymers, epoxy acrylate polymers, polyacetals, polycarbonate, polysulfone, cellulose acetate butyrate, polyvinyl chloride, and blends thereof.

If the polymeric film is a polyester film, it may incorporate any polyester-containing polymer. Useful polyester polymers include, for example, polymers having terephthalate, isophthalate, and/or naphthalate comonomer units, e.g., polyethylene naphthalate (PEN), polyethylene terephthalate (PET) and copolymers and blends thereof. Other suitable polyester materials include polycarbonates, polyarylates, and other naphthalate and terephthalate-containing polymers, such as, for example, polybutylene naphthalate (PBN), polypropylene naphthalate (PPN), and polybutylene terephthalate (PBT).

The polymeric film may comprise additives such as, for example, lubricants and other melt processing aids, pigments, dyes and other colorants, supplemental ultraviolet light stabilizers, (e.g., hindered amine light stabilizers (i.e., HALS)), antioxidants, nucleating agents, fillers, plasticizers, whitening agents, flame retardants, antistatic and slip agents, and the like.

Polymeric films may be prepared by known techniques including casting or melt extrusion. The polymeric film may be embossed by known techniques.

The structures of the present invention may comprise one or more layers in addition to the polymeric film. For example, the structure may comprise an adhesive. The adhesive may be a pressure sensitive adhesive or a non-pressure sensitive adhesive (e.g., a thermally cured adhesive or a moisture cure adhesive). In some embodiments, the adhesive is preferably a pressure sensitive adhesive. In some embodiments, the adhesive layer is a clear adhesive. In some embodiments, the adhesive layer contains low amounts of residuals (e.g., a low outgassing adhesive).

One class of materials useful for the adhesive includes acrylate and methacrylate polymers and copolymers. Such polymers are formed, for example, by polymerizing one or more monomeric acrylic or methacrylic esters of non-tertiary alkyl alcohols, with the alkyl groups having from 1 to about 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate.

Optionally, one or more monoethylenically unsaturated co-monomers may be polymerized with the acrylate or methacrylate monomers. The particular type and amount of co-monomer is selected based upon the desired properties of the polymer.

One group of useful co-monomers includes those having a homopolymer glass transition temperature greater than the glass transition temperature of the (meth)acrylate (i.e., acrylate or methacrylate) homopolymer. Examples of suitable co-monomers falling within this group include acrylic acid, acrylamides, methacrylamides, substituted acrylamides (such as N,N-dimethyl acrylamide), itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkyl(meth) acrylates, N,N-dimethyl aminoethyl (meth)acrylate, N,N-diethylacrylamide, beta-carboxyethyl acrylate, vinyl esters of neodecanoic, neononanoic, neopentanoic, 2-ethylhexanoic, or propionic acids (e.g., those available under the trade name VYNATES, available from Union Carbide Corp., located in Danbury, Conn.), vinylidene chloride, styrene, vinyl toluene, and alkyl vinyl ethers.

A second group of monoethylenically unsaturated co-monomers that may be polymerized with the acrylate or methacrylate monomers includes those having a homopolymer glass transition temperature (Tg) less than the glass transition temperature of the acrylate homopolymer. Examples of suitable co-monomers falling within this class include ethyloxyethoxy ethyl acrylate (Tg=−71 degrees Celsius) and a methoxypolyethylene glycol 400 acrylate (Tg=−65 degrees Celsius; available under the trade name NK Ester AM-90G from Shin Nakamura Chemical Co., Ltd.).

A second class of polymers useful in the adhesive includes semicrystalline polymer resins, such as polyolefins and polyolefin copolymers (e.g., polymer resins based upon monomers having between about 2 and about 8 carbon atoms, such as low-density polyethylene, high-density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with a base), and cellulose acetate. Other examples of polymers in this class include amorphous polymers such as polyacrylonitrile, polyvinyl chloride, thermoplastic polyurethanes, aromatic epoxies, polycarbonates, amorphous polyesters, amorphous polyamides, ABS block copolymers, polyphenylene oxide alloys, ionomers (e.g., ethylene-methacrylic acid copolymers neutralized with salt), fluorinated elastomers, and polydimethyl siloxane.

A third class of polymers useful in the adhesive includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber. This class of polymer is typically combined with tackifying resins.

A fourth class of polymers useful in the adhesive includes pressure sensitive and hot melt applied adhesives prepared from non-photopolymerizable monomers. Such polymers can be adhesive polymers (i.e., polymers that are inherently adhesive), or polymers that are not inherently adhesive but are capable of forming adhesive compositions when compounded with components such as plasticizers, or tackifiers. Specific examples include poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends).

In some embodiments, silicone based adhesives may be particularly suited.

The adhesive layer may be radiation cured (e.g., thermally cured, ultraviolet light cured, or electron beam cured) and can be solvent-based, water-based or 100 percent solids.

In some embodiments, the adhesive layer has a thickness of at least about 5 microns (e.g., at least about 10 microns). In some embodiments, the adhesive layer is less than about 150 microns (e.g., less than about 50 microns, e.g., less than about 25 microns).

The adhesive may comprise additives, such as fillers, antioxidants, viscosity modifiers, pigments, tackifying resins, fibers, and the like.

Figure 3:
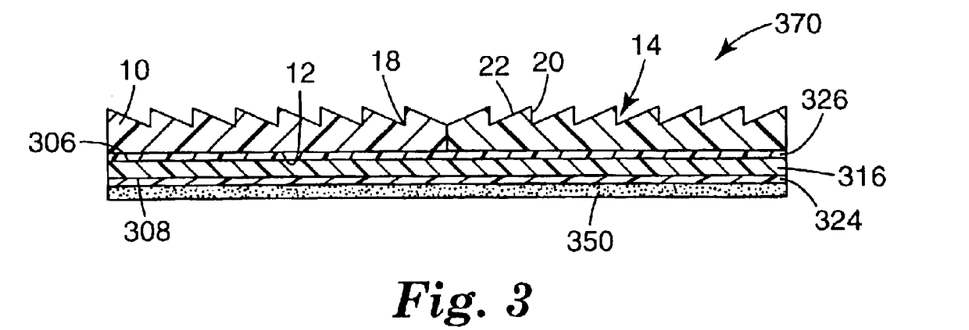
FIG. 3 is a side view of a multilayer structure with a structured surface in accordance with an embodiment of the present invention.

FIG. 3 shows an exemplary structure 370 useful in the present invention. The structure 370, comprises a polymeric film 316, having a first surface 306, and a second surface 308. The structure 370, further comprises a resin layer 10, having a smooth surface 12, and a structured surface 14. The structured surface 14, of the resin layer 10, may comprise grooves 18. The grooves 18, may comprise a first facet 20, perpendicular to the smooth surface 12, of the resin layer 10, and a second facet 22.

In some embodiments, the pitch of the grooves, the distance between peaks of the grooves, is sufficiently small such that an observer from a distance (e.g., about 3 meters) cannot discern the individual grooves. In some embodiments, the pitch will be at least about one micron (e.g., at least about five microns, e.g., at least about ten microns). In some embodiments, the pitch will be less than about 500 microns (e.g., less than about 250 microns, e.g., less than about 50 microns). In some embodiments, the depth of the grooves will be less than about 200 microns (e.g., less than about 100 microns, e.g., less than about 75 microns).

In some embodiments, the smooth surface 12, of the resin layer 10, may be bonded directly to the first surface 306, of the polymeric film 316. In some embodiments, a first primer layer 326, may be located between the resin layer 10, and the polymeric film 316.

The structure 370, further comprises an adhesive layer, 350. In some embodiments, the adhesive layer 350, may be bonded directly to the second surface 308, of the polymeric film 316. In some embodiments, a second primer layer 324, may be located between the adhesive layer 350, and the polymeric film 316.

In some embodiments at least about 80 percent (e.g., at least about 90 percent, e.g., about 100 percent) of the second surface 308, the polymeric film 316, has the adhesive layer 350, bonded thereto. In some embodiments, the adhesive layer 350, is continuous. In some embodiments, areas of the polymeric film 316, not covered by the adhesive layer 350, are margin(s) (i.e., the peripheral edges of the polymeric film).

In some embodiments, an adhesive layer may be bonded to the structured surface 14, of the resin layer 10. In some embodiments, a primer layer may be located between the adhesive layer and the resin layer.

There are numerous methods available for treating the surfaces of a polymeric film to improve the adhesion of an adhesive and/or resin layer thereto. Such methods include, for example, chemical etching, electron-beam irradiation, corona treatment, plasma etching, coextrusion of adhesion promoting layers, and coating the polymeric film with adhesion promoting primer coatings, some of which may be subsequently crosslinked. Exemplary primer coatings include coatings comprising melamine acrylate based primers and aqueous, cross-linked urethane polyester primers.

Application of the primer coating may be carried out by standard coating techniques such as bar coating, roll coating, curtain coating, rotogravure coating, spraying and dipping. In some embodiments, the primer layer may be extruded onto the polymeric film. In some embodiments, the primer layer may be coextruded with the polymeric film. The polymeric film may be treated prior to the application of the primer layer. Various known treatment techniques include corona discharge, flame treatment, and electron beam irradiation.

The resin layer may comprise a polymer (e.g., acrylic, polycarbonate, polyester, polyethylene, polyurethane, and cellulose acetate butyrate). In some embodiments, resins having one or more of the following properties are particularly suitable: high thermal stability, environmental stability, clarity, excellent release from toolings or molds, and high receptivity for receiving a reflective coating. Exemplary resins include: poly(carbonate), poly(methylmethacrylate), polyethylene terephthalate, aliphatic polyurethane, and cross-linked acrylate such as mono- or multi-functional acrylates or acrylated epoxies, acrylated polyesters, and acrylated urethanes blended with mono- and multi-functional monomers. In some embodiments, resins that provide highly effective refraction as well as sufficient durability and weatherability, are particularly suitable.

One class of materials suitable for the resin layer is reactive resin systems capable of being cross-linked by a free radical polymerization mechanism by exposure to radiation, for example, electron beam, ultraviolet light, or visible light. Additionally, these materials may be polymerized by thermal means with the addition of a thermal initiator such as, for example, benzoyl peroxide. Radiation-initiated cationically polymerizable resins also may be used. Reactive resins may be blends of photoinitiator and at least one compound bearing an acrylate group. In some embodiments, the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate as used herein encompasses both acrylates and methacrylates. U.S. Pat. No. 4,576,850 (Martens) discloses examples of crosslinked resins that may be used in the present invention.

Ethylenically unsaturated resins, which include both monomeric and polymeric compounds that contain atoms of carbon, hydrogen and oxygen, and optionally nitrogen, sulfur, and the halogens, may be used herein. Oxygen or nitrogen atoms, or both, are generally present in ether, ester, urethane, amide, and urea groups. In some embodiments, ethylenically unsaturated compounds having a molecular weight of less than about 4,000 are particularly suitable. In some embodiments, the ethylenically unsaturated compounds are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross-linked.

Some illustrative examples of compounds having an acrylic or methacrylic group that are suitable for use in the invention are listed below:

(1) Monofunctional compounds: ethylacrylate, n-butylacrylate, isobutylacrylate, 2-ethylhexylacrylate, n-hexylacrylate, n-octylacrylate, isooctyl acrylate, isobornyl acrylate, tetrahydrofurfuryl acrylate, 2-phenoxyethyl acrylate, and N,N-dimethylacrylamide;

(2) Difunctional compounds: 1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional compounds: trimethylolpropane triacrylate, glycerol triacrylate, pentaerythritol triacrylate, pentaerythritol tetraacrylate, and tris(2-acryloyloxyethyl)isocyanurate.

Some representative examples of other suitable ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Illustrative examples of photopolymerization initiators that can be blended with acrylic compounds in the resin layer include: benzil, methyl o-benzoate, benzoin, benzoin ethyl ether, benzoin isopropyl ether, benzoin isobutyl ether, etc., benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. The compounds may be used individually or in combination.

Cationically polymerizable materials including, but are not limited to, materials containing epoxy and vinyl ether functional groups may be used herein. These systems are photoinitiated by onium salt initiators, such as triarylsulfonium, and diaryliodonium salts.

In some embodiments, particularly suitable materials to form the resin layer include, for example, UV polymerizable polymers. Exemplary resin layers include acrylate systems (e.g., hexanediol diacrylate (e.g., SARTOMER SR238, available from Sartomer, located in Exton, Pa.)), epoxy acrylate (e.g., CN104, available from Sartomer), and phenoxyethyl acrylate (e.g., PHOTOMER 4035, available from Cognis, located in Amber, Pa.). In some embodiments, aliphatic systems are particularly suitable (e.g., aliphatic urethane acrylate (e.g., PHOTOMER 6010 and 6210 available from Cognis)).

In some embodiments, particularly suitable initiators include, for example, long wavelength curable materials (e.g., LUCIRIN TPO, available from BASF; or IRGACURE 819, available from Ciba Specialty Chemicals North America).

The ultraviolet light absorbing compounds of the present invention are preferably triazine compounds, and in particular hydroxy-functional tris-aryl triazine compounds. Generally, these compositions will correspond to the chemical formula:

wherein each $R^1$ is independently selected from the group consisting of hydrogen and substituted or unsubstituted, branched or unbranched alkyl, aryl, or alkaryl groups having from 1 to about 18 carbon atoms. In some embodiments, the carbon chains of any such alkyl, aryl, or alkaryl group are free of interruption by one or more oxygen atoms and are not substituted by a hydroxy substituent. In some embodiments, the carbon chains of any such alkyl, aryl, or alkaryl group have one or more reactive functional groups (e.g., hydroxyl groups).

Particularly preferred ultraviolet light absorbing compounds include 2-(4,6-diphenyl-1,3,5-triazin-2-yl)-5-hexyloxy-phenol and 2-(4,6-bis(2,4-dimethylphenyl)-1,3,5-triazin-2-yl)-5-octyloxy)phenol. Suitable ultraviolet absorbing compounds are available commercially, including, e.g., those available under the trade names CYASORB UV-1164, available from Cytec Industries Inc., and TINUVIN 1577, available from Ciba Specialty Chemicals North America.

An effective amount of UVA should be present in one or more layers of the structure. An effective amount of UVA is amount sufficient to maintain the delta b* value at less than about 9 after an exposure of 6000 kJ/m² at 340 nanometers (e.g. less than about 5.5 after 6000 kJ/m² at 340 nanometers), where the exposure is a repeating test cycle of 8 hours of light at 88° C., black panel temperature, followed by 4 hours dark at 50° C., in accordance with ASTM G-155 test method, and where the b* value is based on D-65, 10 degree observer, specular included, reflectance measurements. In some embodiments, the delta b* is less than about 11 after 8400 kJ/m² at 340 nanometers (e.g., less than about 4 after 8400 kJ/m² at 340 nanometers). Delta b* is the difference between the b* value measured after the exposure and the initial b* value.

In some embodiments, the ultraviolet light-absorbing compound is present in the light stable structure in an amount between about 0.25% (e.g., 0.5%, e.g., 1%) and about 5% (e.g. 4%, e.g., 3%) by weight of the polymeric film. In some embodiments, about 1.5% by weight of the ultraviolet light-absorbing compound is present. In some embodiments, about 2% by weight of the ultraviolet light-absorbing compound is present. In some embodiments, about 3% by weight of the ultraviolet light-absorbing compound is present.

In addition to the UVA, the structure of the present invention may comprise a hindered amine light stabilizing (HALS) composition. Many useful HALS are known in the art. Generally, the most useful HALS compositions are those derived from a tetramethyl piperidine, and those that can be considered polymeric tertiary amines. Broadly, these include high molecular weight (i.e., above about 500), oligomeric, and polymeric compounds that contain a polyalkylpiperidine constituent, including polyesters, polyethers, polyamides, polyamines, polyurethanes, polyureas, polyaminotriazines and copolymers thereof. Preferred HALS compositions are those containing polymeric compounds made of substituted hydroxypiperidines, including the polycondensation product of a hydroxypiperidines with a suitable acid or with a triazine. A particularly preferred HALS compound is the polycondensation product of 1-(2-hydroxyethyl)-2,2,6,6-tetramethyl-4-hydroxypiperidine with succinic acid. Suitable HALS compositions are available commercially, for example, under the TINUVIN trade name from Ciba Specialty Chemicals North America. One such useful HALS composition is TINUVIN 622.

The UVA may be present in one or more layers of the structure. In some embodiments, the UVA is present in the polymeric film. An effective amount of the UVA compound can be incorporated into the polymeric film in any manner that facilitates the ability of the structure to retard deleterious effects of exposure to unwanted radiation, in particular ultraviolet radiation. The UVA can, for example, be incorporated along with any additional additives and adjuvants directly into the polymeric resin(s) either, before, during, or after its formation into a film. Such incorporation can take place using any conventional method of mixing or dispersing additives into a polymer resin, such as, for example, milling or extrusion.

In some embodiments, the UVA may be applied to one or both surfaces of the polymeric film. For example, in some embodiments the UVA may be coextruded with the polymeric film. In some embodiments, the UVA may be coated onto one or both surfaces of the polymeric film, using any known coating technique (e.g., roll coating, gravure coating).

In some embodiments, the UVA may be incorporated into a primer layer, a resin layer, and/or an adhesive layer. Such incorporation can take place using any conventional method of mixing or dispersing additives into a polymer resin, such as, for example, milling or extrusion.

EXAMPLES

The following examples are offered to aid in the understanding of the present invention and are not to be construed as limiting the scope thereof. Unless otherwise indicated, all parts and percentages are by weight.

FILM MAKING PROCEDURE

Polyester film was prepared for use in the Examples in a batch reactor using ethylene glycol and dimethyl terephthalate as starting materials. The polyester resin was made using 0.02% cobalt acetate (available from The Shepherd Chemical Company, located in Cincinnati, Ohio), 0.02% zinc acetate (available from Mallinckrodt Baker, Inc., located in Phillipsburg, N.J.), and 0.03% antimony triacetate (available from Atofina Chemicals, located in Philadelphia, Pa.). The polyester resin also contained 0.04% triethyl phosphonoacetate (TEPA) (available from Albright and Wilson Co., located in Glen Allen, Va.). TEPA is believed to serve as a catalyst scavenger during subsequent extrusion processing, stabilizing the polyester resin and preventing the formation of chemically reactive sites on the polymer chains.

The films were made on a continuous pilot-plant-sized sequential biaxial orientation film manufacturing line. A 40 mm twin screw extruder, equipped with high shear mixing screws to enhance mixing of the polymer and additives, was used. A twin screw powder feeder was used to meter the additives to the extruder. A film die having manual die bolt adjustments was used. A chilled (20° C.) casting wheel was used. Electrostatic pinning was used to aid in quenching the cast web and providing even caliper. The cast web was stretched in the machine direction using a length orienter having preheating rolls and IR heating in the stretching gap. Transverse direction stretching and heat setting was performed in a tenter oven.

RESIN CASTING PROCEDURE

The resin system contained 75 parts PHOTOMER 6210 (available from Cognis), 25 parts hexanediol diacrylate, SR238 (available from Sartomer), and 0.5% of LUCIRIN TPO (available from BASF). The materials were blended with a high-speed mixer, and then heated in an oven at 160° F. (71° C.) for 24 hours. The compounded resin was subsequently cooled to room temperature.

The resin system was coated onto the film using a slot die. The resin-coated film was brought into contact with a tool or mold bearing a prismatic structure using pressure provided by a rotating nip roll. While the resin was in contact with the tool, the resin was cured using a high intensity Fusion Systems "D" lamp (available from Fusion UV Curing Systems, located in Rockville, Md.) with a UV-A (315–400 nm) dose in the range of 100–1000 mJ/cm$^2$.

ACRYLIC PRESSURE SENSITIVE ADHESIVE

The adhesive used in the examples was a vinyl acetate scavenged 90/10 isooctylacrylate (IOA), acrylic acid (AA) blend.

A master solution is prepared including 216 parts of isooctylacrylate, 24 parts of acrylic acid, 0.48 parts of 2,2'-azobis(isobutyronitrile) initiator (available under the trade name VAZO 64, from E. I. du Pont de Nemours and Company, located in Wilmington, Del.) and 360 parts of ethyl acetate solvent. A four ounce (about 120 ml) bottle is filled with 60 parts of the master solution. After purging with nitrogen to remove oxygen, the bottle is sealed and tumbled for sixteen (16) hours at 55° C in a rotating water bath to effect 90 to 95% conversion. The bottle is opened and an additional initiator charge of 2.4 parts of a 1% solution of VAZO 64 in ethyl acetate is added. Fifteen percent (15%) vinyl acetate scavenger, based on the initial monomer charge, is added to the bottle. The bottle is repurged, sealed, and placed in the rotating water bath at 60° C for 20 additional hours to obtain the adhesive solution.

The adhesive solution is taken from the bottle and knife coated onto a 2 mil (50.8 micron) thick, silicone coated polyester film (available under the trade name T-50, from Courtaulds Film, located in Martinsville, Va.) to a 2 mil (50.8 micrometer) dried coating thickness. The adhesive solution thus coated is immediately dried for ten minutes in a 65° C. oven.

SAMPLE MOUNTING PROCEDURE

Sealed multilayer assemblies simulating double-glazed insulated glass window units were prepared to test examples of films containing ultraviolet light absorbing compounds under exposure to ultraviolet light, while in an inert gas environment. Using the ACRYLIC PRESSURE SENSITIVE ADHESIVE, a film sample was laminated to a 6×12 inch (15.24×30.45 cm) glass plate of ⅛-inch (3.2 mm) thickness. This was designated as the bottom glass. A silicone rubber gasket was formed by cutting a 6×12 inch (15.24×30.45 cm) rectangular shape from 114-inch (6.35 mm) thick, Shore 60A durometer sheet stock (available as part No. 8632K96 from McMaster-Carr Supply Company, located in Chicago, Ill.) and then cutting out a 5×11 inch (12.7×27.9 cm) center portion to form a ½-inch (12.7 mm) wide gasket at the periphery of the glass window unit. This gasket was placed on the bottom glass plate with the film sample attached inside the rectangle formed by the cut gasket. A similar sized 6×12 inch (15.24×30.45 cm) glass plate (cover glass) was placed on top of the silicone gasket to form a sealed chamber between the two panes of glass, simulating a double-glazed insulated glass window unit. The cover glass was ⅛-inch (3.2 mm) thick float glass available from White Bear Glass, located in White Bear, Minn.

Aluminum foil tape (SCOTCH ALUMINUM FOIL TAPE 425, available from 3M Company) was applied around the periphery of the assembly to further seal the chamber and to protect the silicone gasket. The aluminum tape covered the side edges of the bottom glass, the cover glass, and the side edge of the silicone gasket. The aluminum tape also partially covered the face of the bottom glass and cover glass by 1 inch (2.54 cm) in from the edge. Binder Clips (2-inch wide, BC-100, stock number 99100, available from Officemate International Corporation of Edison, N.J.) were also covered with aluminum tape and placed at the edge of the window unit to hold the assembly together.

Two holes were drilled in opposite side edges of the silicone rubber gasket to provide access and egress for an argon gas purge. The atmosphere inside the window unit was maintained at greater than about 98.5% argon during exposure in the accelerated weathering device. The argon concentration was measured using a GasGlass-1000 (available from SparkLike, located in Helsinki, Finland).

UV EXPOSURE PROCEDURE

Each test window unit was placed into a Q-SUN/3000 test chamber, available from Q-Panel Lab Products of Cleveland, Ohio, with air-cooled xenon arc lamps equipped with daylight filters. Light passed through the top cover glass to the film samples, in the argon gas environment, attached to the bottom glass. The units were exposed to a repeating test cycle of 8 hours of light at 88° C., black panel temperature, followed by 4 hours dark at 50° C., in accordance with ASTM G-155 test method.

COLOR MEASUREMENT PROCEDURE

Color changes of the samples, specifically yellowing, was measured as a b* value using a ColorEye 2180 Spectrophotometer, available from GretagMcBeth of New Windsor, N.Y. (D65, 10 degree observer, specular included). Specimens were measured in reflectance mode (on glass) using a white ceramic standard white tile as background for the sample/glass plate. Measurements were based on the CIElab colorspace. Measurements and color differences were determined following D2244-02 Standard Practice for Calculation of Color Tolerances and Color Differences from Instrumentally Measured Color Coordinates.

SAMPLE DESCRIPTIONS

Comparative Example C1 is a 2 mil (51 micrometer) polyester film containing TINUVIN 360, a benzotriazole UV stabilizer. This film is available under the trade name MELINEX 943 from Dupont Teijin, located in Wilmington, Del. The ACRYLIC PRESSURE SENSITIVE ADHESIVE was laminated to one surface of the film for subsequent mounting to the bottom glass.

Comparative Example C2 is a 100 gauge (25.4 micrometer) polyester film containing CYASORB UV-3638, a benzoxazinone UV absorber. This film is available under the trade name HB3 from Dupont Teijin Films. The ACRYLIC PRESSURE SENSITIVE ADHESIVE was laminated to one surface of the film for subsequent mounting to the bottom glass.

Example 1 is a 1 mil (25.4 micrometer) polyester film made according to the FILM MAKING PROCEDURE. The film contains 2% by weight CYASORB UV-1164, a triazine UV absorber available from Cytec Industries Inc. The ACRYLIC PRESSURE SENSITIVE ADHESIVE was laminated to one surface of the film for subsequent mounting to the bottom glass.

Example 2 is a 5 mil (127 micrometer) polyester film made according to the FILM MAKING PROCEDURE. The film contains 2% by weight CYASORB UV-1164. The ACRYLIC PRESSURE SENSITIVE ADHESIVE was laminated to one surface of the film for subsequent mounting to the bottom glass.

Example 3 is a 1 mil (25.4 micrometer) polyester film made according to THE FILM MAKING PROCEDURE. The film contains 1.5% by weight TINUVIN 1577, a triazine UV absorber available from Ciba Specialty Chemicals Corporation. The ACRYLIC PRESSURE SENSITIVE ADHESIVE was laminated to one surface of the film for subsequent mounting to the bottom glass.

Example 4 is a 1 mil (25.4 micrometer) polyester film made according to the FILM MAKING PROCEDURE. The film contains 2% CYASORB UV-1164. One surface of the film was primed with Primer A, a primer containing 99% cyclohexanone, 0.5% vinyl chloride/vinyl acetate/vinyl alcohol terpolymer resin (available under the trade name UCAR VAGH, from Union Carbide, located in South Charleston, W. Va.), and 0.5% polyester resin. Primer A was applied using gravure coating and was dried at 250° F. (121° C) for about 45 seconds. The ACRYLIC PRESSURE SENSITIVE ADHESIVE was laminated to the unprimed surface of the film for subsequent mounting to the bottom glass.

Comparative Examples C1 and C2, and Examples 1–4 were mounted in simulated double-glazed insulated glass window units according to the SAMPLE MOUNTING PROCEDURE. The samples were subject to UV exposure according to the UV EXPOSURE PROCEDURE. Samples were periodically removed from the test chamber after exposures of approximately 2600, 3600, 6000, 7200 and 8400 kJ/m$^2$ at 340 nanometers, as indicated in Table 1. Color measurements were conducted using the COLOR MEASUREMENT PROCEDURE. Values of b* are reported in Table 1.

TABLE 1

Values of b* (N/A = no measurement made)

| Example | Initial | Exposure (kJ/m$^2$ at 340 nanometers) | | | | |
|---|---|---|---|---|---|---|
| | | 2636 | 3618 | 6030 | 7236 | 8442 |
| C1 | 2.0255 | 4.797 | 5.559 | 7.535 | 10.5 | 13.135 |
| C2 | 1.77 | 6.25 | 7.97 | 15.18 | 23.87 | 35.42 |

TABLE 1-continued

Values of b* (N/A = no measurement made)

| Example | Initial | Exposure (kJ/m$^2$ at 340 nanometers) | | | | |
|---|---|---|---|---|---|---|
| | | 2636 | 3618 | 6030 | 7236 | 8442 |
| 1 | 2.05 | 3.339 | 3.765 | 4.5 | 5.15 | 5.37 |
| 2 | 3.999 | 4.9885 | 5.523 | 8.46 | 6.865 | 7.335 |
| 3 | 3.29 | 5.85 | N/A | 3.61 | N/A | N/A |
| 4 | 1.82 | 4.8925 | 6.0875 | 10.645 | 14.995 | 24.72 |

Examples of the present invention show improved resistance to UV degradation (yellowing) at 3618 kJ/m$^2$ at 340 nanometers, and more preferably at 8442 kJ/m$^2$. The yellowing observed for Example 4 is believed to be a result of the photodegradation of the vinyl polyester primer present on that sample.

Comparative Example C3 is a decorative, resin-coated, polyester film, available under the trade name ACCENTRIM B200 (available from 3M Company).

Example 5 is a 2 mil (50.8 micrometer) polyester film made according to THE FILM MAKING PROCEDURE. The film contains 2.5% TINUVIN 1577. The one surface of the film was primed with Primer B, a primer containing: 82.9% deionized water, 15.1% NEOREZ R-960 (aqueous urethane from Neoresins, located in Wilmington, Del.), 0.3% NEOCRYL CX-100 (aziridine crosslinker from Neoresins), 1.5% TRITON X-100. (surfactant from Union Carbide), and 0.2% polystyrene beads (30% by weight dispersed in water, available from 3M Company). Primer B was applied pre-tenter using gravure coating and was dried at 150° F (66° C) for about 30 seconds. A 1.7 mil (43.2 micrometer) thick resin layer was applied to the primed surface of the polyester film using the RESIN CASTING PROCEDURE. The ACRYLIC PRESSURE SENSITIVE ADHESIVE was laminated to the unprimed surface of the film for subsequent mounting to the bottom glass.

Example 6 is a 2 mil (50.8 micrometer) polyester film made according to the FILM MAKING PROCEDURE. The film contains 3% TINUVIN 1577. Primer B was applied using gravure coating and was dried at 150° F. (66° C.) for about 30 seconds. A 1.7 mil (43.2 micrometer) thick resin layer was applied to the primed surface of the polyester film using the RESIN CASTING PROCEDURE. The ACRYLIC PRESSURE SENSITIVE ADHESIVE was laminated to the unprimed surface of the film for subsequent mounting to the bottom glass.

Example 7 was made according to the procedure of Example 6, except that the film was UV post-cured in order to cure the resin layer fully. UV post-cure was conducted after the microstructured web was removed from the tool. UV post-cure was performed using a high intensity Fusion Systems "D" spectrum lamp with a UV-A (315–400 nm) dose in the range of 100–1000 mJ/cm$^2$. The UV post-cure light directly impinged on and UV post-cured the resin layer.

Comparative Example C3, and Examples 5–7 were mounted in simulated double-glazed insulated glass window units according to the SAMPLE MOUNTING PROCEDURE. The samples were subject to UV exposure according to the UV EXPOSURE PROCEDURE. Samples were periodically removed from the test chamber after exposures of approximately 2600, 4800, 6000 kJ/m$^2$ at 340 nanometers, as indicated in Table 2. Color measurements were conducted using the COLOR MEASUREMENT PROCEDURE. Values of b* are reported in Table 2.

TABLE 2

Values of b* (N/A = no measurement made)

| EXAMPLE | Initial | Exposure (kJ/m² at 340 nanometers) | | |
|---|---|---|---|---|
| | | 2636 | 4824 | 6030 |
| C3 | 2.54 | 12.93 | N/A | 40.99 |
| 5 | 2.07 | 2.99 | 5.11 | 6.43 |
| 6 | 3.13 | 4.42 | 5.73 | 5.19 |
| 7 | 3.28 | 4.49 | 5.76 | 5.32 |

Examples of the present invention showed improved resistance to photodegradation (yellowing).

Comparative Examples C1–C3, and Examples 1–47 were mounted in simulated double-glazed insulated glass window units according to the SAMPLE MOUNTING PROCEDURE, except that the cover glass plate was replaced with a 3/32-inch (2.4 mm) thick, low emissivity glass plate (available under the trade name LoĒ²-172, from Cardinal IG, located in Minneapolis, Minn.).

The samples were subject to UV exposure according to the UV EXPOSURE PROCEDURE. Samples were periodically removed from the test chamber after exposures of approximately 2600, 3600, 4800, 6000, 7200 and 8400 kJ/M² at 340 nanometers, as indicated in Table 2. Color measurements were conducted using the COLOR MEASUREMENT PROCEDURE. Values of b* are reported in Table 3.

TABLE 3

Values of b* (N/A = no measurement made)

| Example | Initial | Exposure (kj/m² at 340 nanometers) | | | | | |
|---|---|---|---|---|---|---|---|
| | | 2636 | 3618 | 4824 | 6030 | 7236 | 8442 |
| C1 | 2.7 | 2.888 | 3.0055 | N/A | 3.065 | 3.15 | 3.155 |
| C2 | 2.07 | 2.80 | 2.92 | N/A | 3.48 | 3.76 | 3.93 |
| C3 | 2.08 | 2.46 | 2.76 | N/A | 2.92 | 3.29 | 3.52 |
| 1 | 2.895 | 3.101 | 3.312 | N/A | 3.68 | 3.77 | 3.815 |
| 2 | 4.23 | 4.42 | 4.67 | N/A | 4.985 | 5.115 | 5.255 |
| 3 | 3.29 | 3.43 | N/A | 5.23 | 3.61 | N/A | N/A |
| 4 | 2.135 | 2.634 | 2.903 | N/A | 3.335 | 3.64 | 3.835 |
| 5 | 2.06 | 2.57 | N/A | 2.60 | 2.64 | N/A | N/A |
| 6 | 3.49 | 3.58 | N/A | 3.70 | 3.71 | N/A | N/A |
| 7 | 3.66 | 3.68 | N/A | 3.77 | 3.75 | N/A | N/A |

The use of low emissivity glass results in reduced rates of yellowing.

Various modifications and alterations of this invention will be apparent to those skilled in the art without departing from the scope and spirit of this invention, and it should be understood that this invention is not limited to the illustrative embodiments set forth herein.

We claim:

1. An assembly comprising
   an inert environment bounded on at least one side by a pane, wherein the pane is at least partially transparent to ultraviolet light;
   a structure positioned in the inert environment, the structure comprising
      a polymeric film and
      an effective amount of a ultraviolet light-absorbing compound, wherein the ultraviolet light absorbing compound comprises a triazine.

2. The assembly of claim 1, wherein the triazine is a hydroxy-functional tris-aryl triazine.

3. The assembly of claim 1, wherein the triazine is selected from the group consisting of: 2-(4,6-diphenyl-1,3,5-triazin-2-yl)-5-hexyloxy-phenol and 2-(4,6-dis(2,4-dimethylphenyl)-1,3,5-triazin-2-yl)-5-(octyloxy)phenol.

4. The assembly of claim 1, wherein the polymeric film comprises the ultraviolet light-absorbing compound.

5. The assembly of claim 1, further comprising a coating comprising the ultraviolet light-absorbing compound.

6. The assembly of claim 5, wherein the polymeric film comprises a first surface and a second surface, and wherein the coating is applied to at least one of the surfaces of the polymeric film.

7. The assembly of claim 1, wherein the structure comprises a layer comprising a first smooth surface and second structured surface being formed of a plurality of spaced parallel grooves, each said groove being formed by a first facet which is substantially perpendicular to the first smooth surface and a second facet which makes an angle between 1 to 60 degrees with the first smooth surface.

8. The assembly of claim 1, wherein the structure comprises a resin layer.

9. The assembly of claim 8, wherein the resin layer comprises the ultraviolet light-absorbing compound.

10. The assembly of claim 8, further comprising a bonding layer, wherein the bonding layer comprises the ultraviolet light-absorbing compound.

11. The assembly of claim 8, further comprising a primer layer, wherein the primer layer comprises the ultraviolet light-absorbing compound.

12. The assembly of claim 8, wherein the structure comprises an adhesive layer.

13. The assembly claim 1, wherein the polymeric film is a polyester.

14. The assembly of claim 13, wherein the polyester comprises a polyester selected from the group consisting of polyethylene naphthalate, polyethylene terephthalate, polycarbonates, polyarylates, polybutylene naphthalate, polypropylene naphthalate, polybutylene terephthalate, polypropylene terephthalate, and blends and copolymers of any of the above with cacti other or with other polymers.

15. The assembly of claim 1, wherein the structure comprises an adhesive.

16. The assembly of claim 15, wherein the ultraviolet light-absorbing compound is in the adhesive.

17. The assembly of claim 8, wherein the polymeric film comprises a first surface and a second surface, wherein the resin layer comprises a first surface and a second surface, and wherein the second surface of the resin layer is adjacent the first surface of the polymeric film.

18. The assembly of claim 8, wherein the structure comprises a first primer layer, wherein the polymeric film comprises a first surface and a second surface, wherein the resin layer comprises a first surface and a second surface, and wherein the first primer layer is adjacent to both the second surface of the resin layer and the first surface of the polymeric film.

19. The assembly of claim 18, wherein the structure comprises an adhesive layer.

20. The assembly of claim 19, wherein the adhesive layer is adjacent to the second surface of the polymeric film.

21. The assembly of claim 19, wherein the adhesive layer is adjacent to the first surface of the resin layer.

22. The assembly of claim 18, wherein the structure comprises an adhesive layer and a second primer layer, wherein the second primer layer is adjacent to both the second surface of the polymeric film and the adhesive layer.

23. The assembly of claim 8, wherein the resin layer is a radiation curable resin.

24. The assembly of claim 1, wherein the structure exhibits a delta b* yellowing value of less than 9 after exposure to a radiant dose of 6000 kJ/m² at 340 nm, according to ASTM G-155 test method, employing a repeating test cycle of 8 hours of light at 88° C., black panel temperature, followed by 4 hours dark at 50° C., wherein the delta be value is based on D-65, 10 degree observer, specular included, reflectance measurements.

25. The assembly of claim 1, wherein the inert environment comprises a vacuum.

26. The assembly of claim 1, wherein the inert environment comprises an inert gas.

27. The assembly of claim 26, wherein the inert environment comprises less than about 3% oxygen.

28. The assembly of claim 26, wherein the inert gas is a noble gas.

29. The assembly of claim 28, wherein the noble gas is argon.

30. The assembly of claim 1, wherein the pane is low emissivity glass.

31. The assembly of claim 1, further comprising
 a second pane;
 a frame, wherein the frame secures the first and second pane.

32. An assembly comprising
 a first pane;
 a second pane;
 a frame, wherein the frame secures the first and second pane;
 an inert environment between the first and second panes;
 a polymeric film positioned in the inert environment; and
 an effective amount of a ultraviolet light-absorbing compound, wherein the ultraviolet light absorbing compound comprises a triazine.

33. The assembly of claim 32, wherein at least one of the panes further comprises a coating comprising the ultraviolet light absorbing compound.

34. The assembly of claim 32, wherein at least one of the panes comprises a low emissivity glass.

35. The assembly of claim 32, further comprising a hindered amine light stabilizer.

36. The assembly of claim 1, wherein the structure further comprises a hindered amine light stabilizer.

* * * * *

UNITED STATES PATENT AND TRADEMARK OFFICE
CERTIFICATE OF CORRECTION

PATENT NO. : 6,811,841 B1  Page 1 of 1
APPLICATION NO. : 10/413684
DATED : November 2, 2004
INVENTOR(S) : Stephanie B. Castiglione It is certified that error appears in the above-identified patent and that said Letters Patent is hereby corrected as shown below:

Column 3
Line 54, delete "40" and insert -- 140 -- therefor.

Column 7
Line 1, delete "octadccyl" and insert -- octadecyl -- therefor.
Line 18, delete "isobomyl" and insert -- isobornyl -- therefor.

Column 11
Line 41, insert -- ( -- before "oxtyloxy)".

Column 14
Line 8, delete "114-inch" and insert -- ¼ inch -- therefor.
Line 56, delete "D65" and insert -- D-65 -- therefor.

Column 17
Line 16, delete "1-47" and insert -- 1-7 -- therefor.
Line 27, delete "kJ/M$^{2}$" and insert -- kJ/m$^2$ -- therefor.

Column 18
Line 39, in Claim 14, delete "cacti" and insert -- each -- therefor.

Column 19
Line 7, in Claim 24, delete "be" and insert -- b* -- therefor.
Line 13, in Claim 27, delete "claim 26" and insert -- claim 25 -- therefor.

Signed and Sealed this

Twenty-first Day of November, 2006

JON W. DUDAS
*Director of the United States Patent and Trademark Office*